Nov. 3, 1925.
G. W. EMRICK
1,559,944
CLUTCH CONSTRUCTION FOR TAPPING ATTACHMENTS AND THE LIKE
Filed June 29, 1923
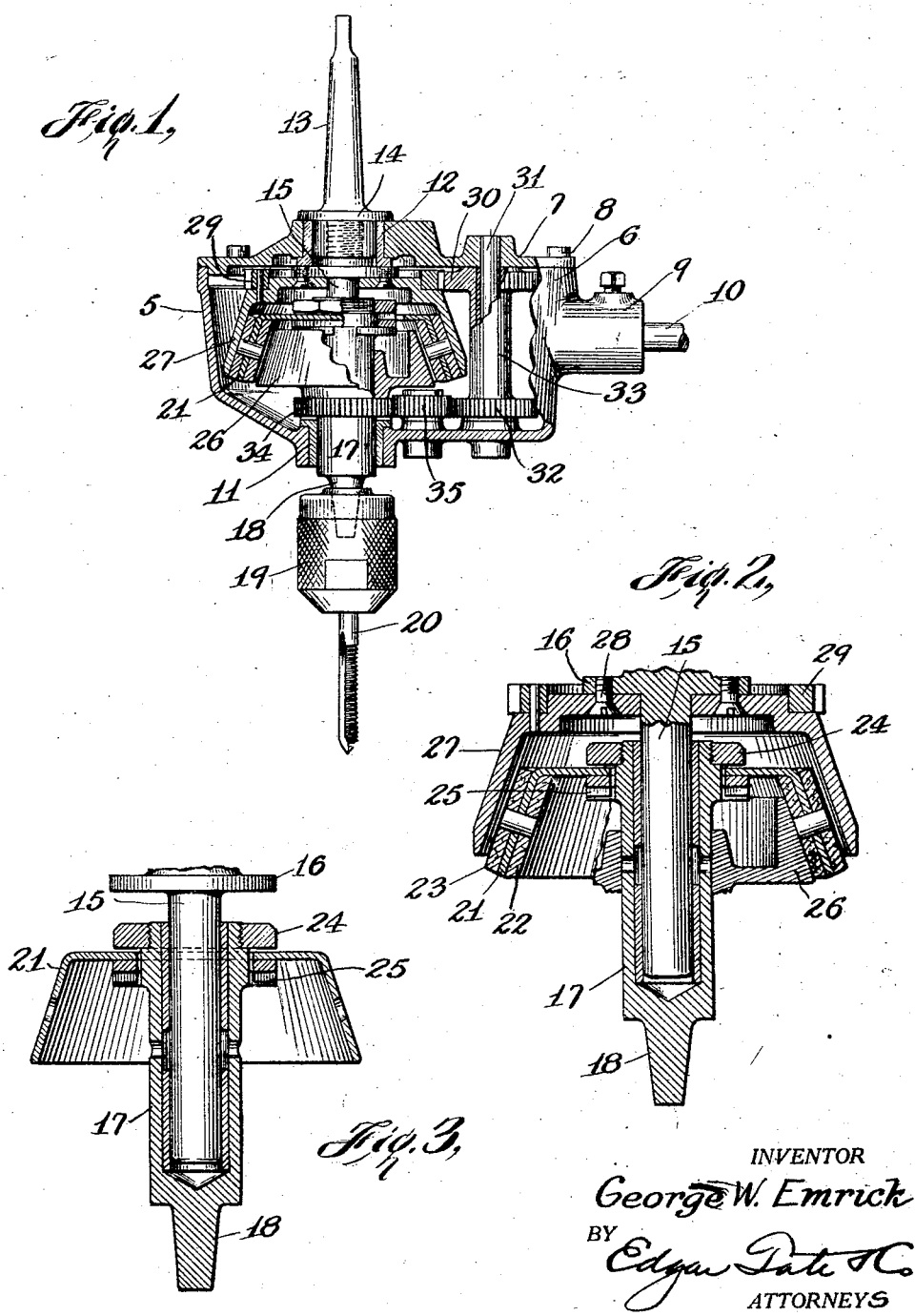
INVENTOR
George W. Emrick
BY
Edgar Tate & Co
ATTORNEYS Patented Nov. 3, 1925.

1,559,944

UNITED STATES PATENT OFFICE.

GEORGE W. EMRICK, OF BROOKLYN, NEW YORK.

CLUTCH CONSTRUCTION FOR TAPPING ATTACHMENTS AND THE LIKE.

Application filed June 29, 1923. Serial No. 648,465.

*To all whom it may concern:*

Be it known that I, GEORGE W. EMRICK, a citizen of the United States, and residing at Brooklyn, in the county of Kings and State of New York, have invented certain new and useful Improvements in Clutch Constructions for Tapping Attachments and the like, of which the following is a specification, such as will enable those skilled in the art to which it appertains to make and use the same.

This invention relates to clutch constructions and particularly to devices of this class designed for use in connection with tapping attachments and other apparatus where any clutches of the class under consideration may be used, and the object of the invention is to provide a clutch device composed of two clutch members of conical construction and an intermediate clutch having inner and outer facings adapted to cooperate with said clutch members, said intermediate clutch being mounted on a movable spindle whereby the same may be moved into engagement with the separate clutch members to govern predetermined transmissions of power or the rotation of elements in predetermined direction; a further object being to provide a clutch of the class and for the purpose specified which is automatic and yet positive in operation, means being provided to allow for the slippage of said clutch members one upon the other when subjected to excess stress or strain; and with these and other objects in view the invention consists in a clutch construction of the class and for the purpose specified which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a sectional view through a tapping attachment showing my improved clutch construction and indicating one method of its use;

Fig. 2 a view similar to Fig. 1 on an enlarged scale and showing only a part of the construction; and Fig. 3 a view similar to Figs. 1 and 2 but showing only a part of the construction shown in said figures.

In Fig. 1 of the drawing, I have shown for the purpose of illustrating one use of my clutch device a tapping attachment such as shown and described in Letters Patent of the United States No. 1,506,367, dated August 26, 1924, and in Fig. 1, 5 represents a cup-shaped casing having an extension 6 at one side, said casing and extension being open at the top and closed by a cover 7 held in position by screws 8, and at one side of the extension 6 is a projecting post 9 in connection with which a rod 10 may be connected to permit of the mounting and handling of the attachment.

The casing 5 is provided with a bearing portion 11 and the cover 7 with a similar bearing portion 12, and a tapered shaft 13 is mounted in the bearing 12 and projects therefrom and by means of which the attachment may be mounted in connection with a suitable machine.

The shaft 13 is provided with a flange 14 and a shaft 15 is mounted in the casing and provided with a flange 16, and the shafts 13 and 15 are in threaded engagement with each other as indicated in dotted lines in Fig. 1. The shaft 15 extends downwardly into a sleeve portion 17 which extends through the bottom of the casing 5, and said sleeve is provided with an angular head 18 to receive a suitable chuck device 19 which device is adapted to support a tap or other tool 20 as shown in Fig. 1.

Mounted on and forming a part of the sleeve 17 is a clutch element 21 which is conical in form in the construction shown, and the inner and outer faces of which are provided with suitable clutch facings 22 and 23, and the clutch element 21 is held against displacement on the sleeve 17 by a nut 24 and by interlocking means as shown at 25 in Figs. 2 and 3 of the drawing but in Fig. 3 the clutch facings 22 and 23 are omitted. It will be noted that a clearance is provided between the top of the clutch element and the nut 24 and clearance is also provided between the bore of the element 21 and the sleeve 17, thus permitting of slight lateral movement of the element 21 on the sleeve 17. The element 21 as will be apparent is movable toward and from the clutch members 26 and 27 by the upward and downward movement of the sleeve 17 or the chuck 19 mounted thereon, and this construction provides a full floating clutch element as will be apparent.

Mounted in the casing 5 are inner and outer clutch members 26 and 27 both of which are conical in form and the inner clutch member 26 is rotatably mounted on the sleeve 17 and adapted to cooperate with the inner clutch facing 22, while the outer clutch member is secured to the shaft 15, or the flange 16 thereof, by screws 28 as clearly shown in Fig. 2 of the drawing, and said last named clutch member is provided with a gear 29 which is adapted to mesh with a gear 30 on a shaft 31 mounted vertically in the enlarged portion 6 of the casing 5, and mounted on the shaft 31 is another gear 32 coupled with the gear 30 through a sleeve portion 33, and said last named gear is in operative connection with a gear 34 on the inner clutch member 26 through a pinion 35 rotatably mounted in the casing 5 as clearly shown in Fig. 1.

From the foregoing it will be apparent that in the rotation of the shaft 13 by a suitable power source the outer clutch member 27 will be positively rotated through its mounting in connection with the shaft 15 which is coupled with the shaft 13, and in this operation the inner clutch member 26 will also be rotated by reason of the gear construction above described, but the last named clutch member will be rotated in a direction opposite to that of the first named clutch member, while the clutch element 21 is floating between said inner and outer clutch members and is normally resting by gravity upon and is rotated by the inner clutch member 26. In entering the tool or tap 20 in a workpiece the pressure of the tap on such workpiece will automatically raise the clutch element 21 in the casing 5 and into engagement with the outer clutch member 27 and will be rotated to perform the desired function or operation. In removing the tap or other tool 20 from the workpiece by the upward movement of the casing 5 in the usual manner the clutch element 21 will be automatically moved out of engagement with the clutch member 27 and into engagement with the clutch member 26 to drive the tool 20 in the opposite direction.

By reason of the construction of the clutch element and clutch members a certain amount of slippage is provided between the clutch element and both of the clutch members, whereby when a tool mounted in the chuck 19 is subjected to an undue strain or stress the slippage will prevent the breaking of such tool or causing other damage or injury.

It will be understood that while I have shown my improved clutch construction as applied to a specific apparatus, I am not necessarily limited to this use thereof, the distinctive feature of my invention being to provide a clutch construction composed of inner and outer clutch members and an intermediate and floating clutch element adapted to operate in connection with either of said clutch members and to be driven in opposite directions thereby, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. In a device of the class described provided with two rotatable conical members mounted one within the other, a conical clutch member mounted between said rotatable members and provided with clutch facings adapted to operate in connection with either of said members, and means for providing a full floating mounting for said clutch member.

2. In a clutch mechanism of the class described employing two clutch members, a two-faced conical full floating clutch element, friction facings mounted on the inner and outer faces of said clutch element, and means for supporting a member in connection with said clutch element.

In testimony that I claim the foregoing as my invention I have signed my name this 25th day of June 1923.

GEORGE W. EMRICK.